Nov. 17, 1959  J. F. McGRATH  2,913,690
ANGULAR POSITION TRANSDUCERS
Filed Feb. 10, 1958

INVENTOR
JOHN F. McGRATH

ATTORNEY

United States Patent Office 2,913,690
Patented Nov. 17, 1959

2,913,690

ANGULAR POSITION TRANSDUCERS

John F. McGrath, Arlington, Mass., assignor to Baldwin-Lima-Hamilton Corporation, a corporation of Pennsylvania Application February 10, 1958, Serial No. 714,363

12 Claims. (Cl. 338—2)

This invention relates to angular position transducers of the type employing a torsional blade upon which electrically responsive means are mounted to measure the torsion of the blade as an indication of the extent of angular movement transmitted to the transducer.

As is well known, angular position transducers are employed in aircraft as well as other equipment for determining the angular position to which a given member may be moved. Such angularity is electrically transmitted to a suitable electrical indicating instrument located in the cockpit of an airplane or to an instrument panel in other equipment.

Angular position transducers of the torsional blade type have heretofore had many serious defects structurally, functionally, and economically. Certain of these defects have been that the lead wires from the gages were subject to fatigue by reason of excessive twisting back and forth of the blade, or where different angular capacities were required it was necessary to have blades of different lengths which in turn required casings of different lengths thus resulting in uneconomical manufacture or in inventory problems, or in other instances the torsional blades were subjected to bending effects which introduced serious errors.

It is an object of my invention to provide an improved angular position transducer of the torsional blade type which permits the use of bonded strain gages but eliminated the fatigue of lead wires from the gages.

Another object is to provide an improved angular position transducer of the torsional blade type that is so constructed and arranged that it is possible to obtain a wide selection of angularity, all within a single length of blade and casing.

A further object is to provide an improved angular position transducer of the torsional blade type that reduces to a minimum any bending effects in the blade and thereby minimizes non-linearity between angular positions and the electrical output of gages mounted on the torsional blade.

Still another object is to provide an improved angular position transducer that is relatively simple in construction, operation and maintenance, combined with a high degree of compactness, ruggedness, and a high degree of accuracy and reliability.

Further objects and advantages will be more apparent to those skilled in the art from the following description of the accompanying drawings in which.

Figure 1:
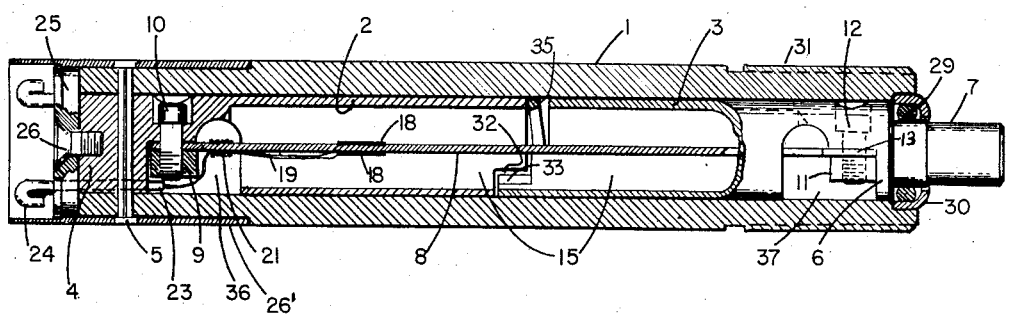
Fig. 1 is a longitudinal sectional view of my improved device.
Figure 2:
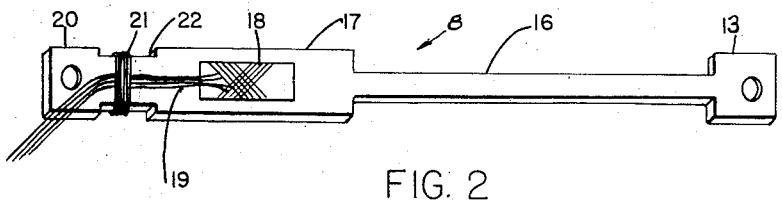
Fig. 2 is a perspective of a torsional blade per se.
Figure 3:
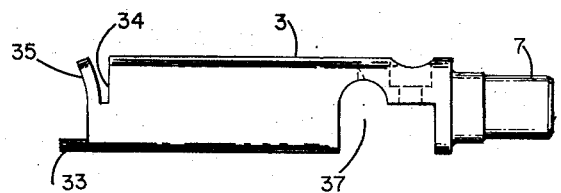
Fig. 3 is a side elevation of the tail shaft showing means for tensioning the torsion blade.

In the illustrated embodiment of my invention I have shown a casing 1 having a cylindrical bore within which axially hollow cylindrical head and tail shafts 2 and 3 are slidably received. The head shaft 2 is closed at its outer end 4 and secured in a stationary position in one-half of the casing 1 by a radial holding element specifically shown as a transverse pin 5. The tail shaft 3 is rotatably journalled within the other half of casing 1 and is also provided with a closed end 6 from which a stub shaft 7 projects for mechanical connection to any suitable member whose angular position is to be determined. A torsional blade 8 is clamped at one end by a plate 9 and screw 10 adjacent to head 4 of the stationary head shaft 2 while the other end 13 is similarly clamped by a plate 11 and screw 12 adjacent to head 6 of tail shaft 3. Thus the blade 8 is contained entirely within the hollow interiors 15 of the members 2 and 3 with the result that this telescopic relationship between such members and the blade performs the dual functions of minimizing the overall length of the device and at the same time providing an axial tailshaft journal bearing equal to about one-half the length of casing 1 thereby preventing bending of the blade when the stub shaft 7 is subjected to a lateral force.

The torsional blade consists of an elongated transversely reduced portion 16, for determining the angular capacity of the cell, and a relatively wide torsional strain sensing portion 17 upon which well-known bonded filament strain gages are mounted preferably at 45° angles to the lengthwise axis of the blade and preferably on both sides thereof for determining the angular position of shaft 7. For instance, the reduced portion 16 allows a relatively large angular movement of shaft 7 with a limited degree of torsional movement of the sensing portion 8. The proportions of elements 16 and 17 may be varied to suit different desired angular capacities while still maintaining a uniform overall length of the blade. Gage lead wires 19 cemented to this sensing portion are carried out at a point adjacent the stationary blade end 20. Because of the sensing portion 8 having a relatively small angular movement, the lead wires are subjected to minimum fatigue. The lead wires may be suitably held by a cord wrapped around the portion of the blade which is notched at 22 to provide a recess for the wrapping. The lead wires are then soldered to the inner ends 23 of external lead connectors 24 which are formed in a terminal plate 25 and extend through openings in the head 4, the terminal plate 25 extending radially over the end of casing 1 and being secured to the head 4 by a screw 26. A protecting sleeve 26' extending over the end of the casing 1 and around the external leads 24 is secured in position by the pin 5. The stub shaft 7 is sealed as by a rubber O-ring 29 held in position by a ferrule 30 press-fitted into the casing 1. The casing may be threaded as at 31 so as to be secured in any desired supporting manner.

To limit the angular rotation of stub shaft 7 and accordingly provide a safety protection for the torsional blade I utilize the feature of having the head shaft 2 and tail shaft 3 extend inwardly toward each other so that their inner ends are adjacent substantially midway of the length of casing 1. Such adjacent ends are respectively provided with a complementary recess 32 and tongue 33 which have a predetermined circumferential clearance so that the rotatable tail shaft 3 can have only a given angular movement relative to the head shaft before the tongue 33 engages one side of recess 32 which is stationary.

To provide safety stops for different angular or rotational capacities it is only necessary to have one or the other members 2 or 3 provided with a different size recess 32 or tongue 33. This can be done either by replacing one or the other members 2 or 3 with different size recesses or tongues, or if a larger capacity is desired either the recess or tongue of the existing members may be cut to enlarge the clearance. Where it is desirable to place the torsional blade under an initial tension in order to resist any possibility of an inward end thrust on shaft 7 which might cause a buckling tendency to be exerted on the blade, I provide a further functional relationship between the adjacent inner ends of the members 2 and 3, in addition to the safety stop at such ends, by partially transversely slotting the end of, say member 3 as at 34 and slightly bending the end 35 so that it engages the end of head shaft 2 to act as a spring to bias the members 2 and 3 away from each other and thus impose a predetermined tension on the torsional blade.

A desirable feature of my improved construction is the ability to assemble entirely outside of the casing 1 all of the operating and electrical elements of my device. For instance, the torsional blade 8 is clamped by the screws 10 and 12 onto the elements 2 and 3 while these are completely removed from casing 1, it being noted that the clamping plates 9 and 11 are easily placed in position through generous size recessed areas 36 and 37. The external terminal plate 25 is then secured to the solid end 4 of head shaft 2 and the gage leads 19 soldered to the inner ends of the external leads 24. The stub shaft 7 of this sub-assembly unit is than inserted through the left end of casing 1 to its fully assembled position in the casing 1 whereupon the pin 5 is inserted to hold the complete assembly together. By removing pin 5 the sub-assembly can be equally easily removed for repair or substitution of a different capacity torsion blade.

From the foregoing disclosure it is seen that the major portion of the angular movement of shaft 7 is taken up by the reduced portion 16 and a proportionately smaller twisting occurs in the strain sensing portion 17. Accordingly, the possibility of fatigue of the lead wires 19 mounted on portion 17 and passing through the stationary end of the device is eliminated for all practical purposes. I also obtain in my improved transducer a wide selection of angular capacities, all within a single length of blade and casing, by varying the thickness of the whole torsion blade, or the length of the reduced torsional section 16, or the width of such reduced section, or any combination of such variations. Thus everything except the torsional blade is standard for all capacities subject to varying only the safety notch to limit the twisting.

The ability to minimize non-linearity, that normally arises from bending of the torsion blade, is obtained by the peculiar combination that also results in a device that is both compact and of single length for all capacities. For instance, a long axial bearing for the tail shaft is produced by the very feature of having hollow head and tail shafts with the torsion blade telescoped within the same which shortens the device. Hence even with the necessary bearing clearance between shaft 3 and casing 1 the long axial bearing surface provides a long moment arm that will not permit any appreciable angling of the tail shaft in a lengthwise direction and accordingly bending effects of any appreciable magnitude are eliminated in case a lateral force is exerted on stub shaft 7. The additional advantage of the telescoped relationship of the torsion blade with the head and tail shafts is that the ends thereof may be functionally used to provide a very effective safety stop as well as a means for pretensioning the torsion blade. By having the stop self-contained within the sub-assembly, the stop is rendered effective by the use of only the single assembly holding pin 5. Such pin does not have to be positioned at any particular angle with respect to the shoulder stops in order to make the stops effective as is the case where a stop is a part of the external casing 1. Combined with all of these and other features is the fact that the device is extremely rugged without sacrificing in any way accuracy of sensitivity.

It will, of course, be understood that various changes in details of construction and arrangement of parts may be made by those skilled in the art without departing from the spirit of the invention as set forth in the appended claims. One example of such changes is that shafts 2 and 3 are relatively rotatable and hence shaft 2 and casing 1 may be rotated while shaft 3 remains stationary. Thus, reference herein to the tail shaft 3 being rotatable and the head shaft 2 being stationary are merely relative expressions used for the convenience of describing and claiming the invention. The device functions identically and produces the same results in either case.

I claim:

1. An angular position transducer comprising, in combination, a torsion blade having two axially spaced portions one of which is a torsion sensing portion and the other of which has a smaller resistance to torsion than the sensing portion, means for holding stationary that end of the blade adjacent to the sensing portion, angularly movable actuating means secured to the other end of the blade adjacent to the other portion of the blade for imparting angular movement thereto, and electrical means connected to the sensing portion of the torsion blade so as to be responsive to torsion therein and accordingly to the angular position of the actuating means, whereby the portion of the blade having the smaller torsional resistance allows a predetermined desired degree of torsion of the actuating means while subjecting the sensing portion to a proportionately smaller torsion.

2. An angular position transducer comprising, in combination, a casing having an axial bore, axially aligned hollow head and tail shafts disposed in said bore, means for securing the head shaft in non-rotative relation to the casing while the tail shaft is journalled therein for angular movement, a blade disposed within and extending along the axis of said hollow shafts in telescopic relation thereto and the opposite ends of the blade being secured respectively to said shafts so as to be subjected to torsion about said axis upon angular movement of the tail shaft, and electrical strain sensing means connected to the torsion blade so as to be responsive to the angular position of the tail shaft.

3. The combination set forth in claim 2 further characterized in that the torsion blade is of substantially uniform thickness and consists of a wide strain sensing portion located at the end of the blade which is secured to the non-rotative head shaft and an elongated portion formed as a continuation of the sensing portion but of reduced width compared to that of the strain sensing portion, the reduced portion being secured to the tail shaft whereby a predetermined degree of angular movement of the tail shaft will subject the sensing portion to a proportionately smaller torsion.

4. The combination set forth in claim 2 further characterized in that the torsion blade consists of a wide strain sensing portion located at that end of the blade which is secured to the non-rotative head shaft and an elongated portion of reduced width compared to that of the strain sensing portion, such elongated portion being connected to the tail shaft whereby the reduced portion is subjected to maximum torsion transmitted from the tail shaft and the sensing portion is subjected to a lesser torsion, and lead wires extending from the electrical strain sensing means past that end of the strain sensing portion that is secured to the stationary head shaft thereby subjecting the lead wires to the lesser torsional effect of the strain sensing portion.

5. The combination set forth in claim 2 further characterized in that the torsion blade consists of a wide strain sensing portion at the end of the blade which is secured to the non-rotative head shaft and an elongated portion of reduced width compared to that of the strain sensing portion, such elongated portion being connected to the tail shaft whereby the reduced portion is subjected to maximum torsion transmitted from the head shaft and the sensing portion is subjected to a lesser torsion, lead wires extending from the electrical strain sensing means past that end of the strain sensing portion that is secured to the tail shaft thereby subjecting the lead wires to the lesser torsional effect of the strain sensing portion, the end of the tail shaft adjacent the fixed end of the strain sensing portion being closed, and an electrical connector terminal plate secured to said closed end and having connectors connected to the gage leads.

6. The combination set forth in claim 2 further characterized in that torsion blade consists of a wide strain sensing portion at that end of the blade which is secured to the non-rotative head shaft and an enlongated portion of reduced width compared to that of the strain sensing portion, such elongated portion being connected to the tail shaft whereby the reduced portion is subjected to maximum torsion transmitted from the tail shaft and the sensing portion is subjected to a lesser torsion, lead wires extending from the electrical sensing means past the end of the strain sensing portion that is secured to the head shaft thereby subjecting the lead wires to the lesser torsional effect of the strain sensing portion, the head shaft adjacent the fixed end of the strain sensing portion being closed, and an electrical connector terminal plate secured to said closed end and extending radially beyond the same so as to provide a shoulder engageable with one end of said casing and having electrical connectors extending through said closed end for connection to the gage leads.

7. The combination set forth in claim 2 further characterized in that the torsion blade consists of a wide strain sensing portion at the end of the blade which is secured to the non-rotative head shaft and an elongated portion of reduced width compared to that of the strain sensing portion, such elongated portion being connected to the tail shaft whereby the reduced portion is subjected to maximum torsion transmitted from the head shaft and the sensing portion is subjected to a lesser torsion, and means for exerting an axial force on the tail shaft to subject the torsion blade to tension so as to resist buckling of the blade in the event of an axial thrust being exerted on the tail shaft.

8. The combination set forth in claim 2 further characterized by the provision of means interposed between the adjacent ends of the head and tail shafts to bias the same away from each other and thereby subject the torsion blade to tension to resist buckling action of the blade in the event of an axial force being exerted on the tail shaft.

9. The combination set forth in claim 2 further characterized in that one of the adjacent ends of the head and tail shafts has a circumferential recess and the adjacent end of the other shaft has a tongue extending into said recess, the recess and tongue having a predetermined circumferential clearance to allow only a predetermined limited angular movement of the tail shaft relative to the recess.

10. The combination set forth in claim 2 further characterized in that one of the adjacent ends of the head and tail shafts has a circumferential recess and the adjacent end of the other shaft has a tongue extending into said recess, the recess and tongue having a predetermined circumference clearance to allow only a predetermined limit angular movement of the tail shaft relative to the recess, and the means for securing the head shaft in non-rotative relation to the casing includes a radial holding element for preventing rotation of the head shaft relative to the casing when the limiting clearance in the tongue and recess are used up, whereby the operation and position of the tongue and recess within the casing are independent of the circumferential positioning of the radial holding element.

11. An angular position transducer comprising, in combination, a torsion blade having two axially spaced coaxial portions one of which is a torsion sensing portion and the other of which has a smaller resistance to torsion than the sensing portion, a casing having a bore, means supported at one end of said casing for holding one end of the blade stationary, an angularly movable shaft extending into said bore from the other end of said casing so that the shaft has an inward end within the casing and an outer end near the other end of the casing, the inward section of the shaft having a substantial axial hollow portion to telescopically receive the blade which is secured to the outer end of the shaft whereby angular movement may be imparted to the blade by the shaft, the inner hollow portion and the outer end of the shaft being rotatably supported by the casing so that there is provided a moment arm extending substantially between the inner and outer ends of the shaft thereby to minimize distortion of the blade from misaligning forces that might act on the hollow shaft in transmitting angular movements thereto, and electrical means connected to the sensing portion of the torsion blade so as to be responsive to torsion therein and accordingly to the angular position of the hollow shaft, whereby the portion of the blade having the smaller torsional resistance allows a predetermined desired degree of torsion of the actuating means while subjecting the sensing portion to a proportionately smaller torsion.

12. The combination set forth in claim 11 further characterized in that the stationary supporting means and the hollow shaft have adjacent ends one of which has a circumferential recess and the other of which has a tongue extending into said recess, the recess and tongue having a predetermined circumferential clearance to allow only a predetermined limited angular movement of the hollow shaft relative to the recess, and the stationary supporting means including a radial holding element for preventing rotation of such supporting means relative to the casing when the limiting clearance in the tongue and recess are used up, whereby the operation and position of the tongue and recess within the casing are independent of the circumferential positioning of the radial holding element.

References Cited in the file of this patent

UNITED STATES PATENTS 2,722,587      Buzzetti et al.  ----------- Nov. 1, 1955